United States Patent [19]

Bozeman

[11] 4,298,021
[45] Nov. 3, 1981

[54] WINTERIZING APPARATUS FOR RECREATIONAL VEHICLES, VACATION HOMES AND THE LIKE

[76] Inventor: Milton R. Bozeman, 1905 Sixth Ave. North, Great Falls, Mont. 59405

[21] Appl. No.: 102,765

[22] Filed: Dec. 12, 1979

[51] Int. Cl.³ .............................................. E03C 1/02
[52] U.S. Cl. ................................. 137/334; 137/384.2; 137/385; 137/899
[58] Field of Search ..................... 137/334, 899, 384.2, 137/385

[56] References Cited

U.S. PATENT DOCUMENTS 2,160,475  5/1939  Josephus .
3,384,123  5/1968  Saddison .
3,929,154  12/1975  Goodwin ........................... 137/899

Primary Examiner—Gerald A. Michalsky
Attorney, Agent, or Firm—Warren F. B. Lindsley

[57] ABSTRACT

An improved winterizing system for a recreational vehicle or vacation home for the prevention of freezing and damage to the plumbing, the system providing for the sequential energizing of solenoid valves and the pump switch to effect the distribution of a non-toxic anti-freeze solution throughout the plumbing lines. A special cam switch assures the proper sequence of electrical switching.

3 Claims, 4 Drawing Figures

WINTERIZING APPARATUS FOR RECREATIONAL VEHICLES, VACATION HOMES AND THE LIKE

BACKGROUND OF THE INVENTION

This invention relates to apparatus for the protection of plumbing systems of recreational vehicles, vacation homes and the like against freezing in winter which has long been a source of inconvenience and concern for the owner.

A number of procedures have been utilized. In the simplest case, the water source is turned off and the pipes are drained by opening valves. In most cases, however, not all the pipes are properly inclined to permit total drainage and compressed air is commonly employed to blow out the remaining water. Even then, the air may pass over the surface of water lying in a nearly level water line so that sufficient water remains to cause trouble.

DESCRIPTION OF THE PRIOR ART

A semi-automatic "winterizing" system has recently been introduced employing push-button controls for the sequential energizing of solenoid valves and pump motors for charging the plumbing lines and fixtures with a non-toxic anti-freeze solution.

In some of these semi-automatic systems, "winterizing" is accomplished by first draining the water storage tank and the water heater and then sequentially operating a series of push-button switches. A by-pass solenoid is energized by means of a first push-button switch to isolate the water heater from the rest of the plumbing system. A second push button starts a water pressure pump and a third push button energizes an anti-freeze solenoid valve which transfers the water supply line from the storage tank to a reservoir containing the non-toxic anti-freeze solution. Faucets and other line terminations are then opened until the anti-freeze solution appears in the discharging water. The system is then shut down with one hot and one cold water faucet left open and "winterizing" is complete. To "de-winterize" and return to normal service, the faucets are closed, the fresh water tank is filled, the bypass solenoid is energized and the pump is turned on. In this case, the anti-freeze solenoid is not energized. Faucets are then opened until the flow of fresh water has cleared the anti-freeze solution from the lines. The by-pass solenoid is then de-energized to permit the refilling of the hot water tank.

While this system reduces the time consumed in the "winterizing" and "de-winterizing" operations, it retains certain disadvantages. Inadvertent operation of the switches in improper sequence can result in the delivery of anti-freeze solution to the water heater. Because of the geometry of the water heater and the arrangement of its inlet and outlet lines, the subsequent total removal of the solution from the tank is difficult and though the solution is non-toxic, the residue is undesirable aesthetically. The system also utilizes an anti-freeze storage tank requiring access through the outer vehicle wall. Installation of the tank involves cutting a hole through the wall and filling the tank is accomplished with difficulty and inconvenience from a stepladder. The present invention provides improvements to the above described system.

No relevant patents are known. However, U.S. Pat. No. 2,160,475 is directed to a freeze eliminator for dining car drains and U.S. Pat. No. 3,384,123 is directed to a freeze protector for self service car wash units, both of which are not believed to be pertinent to this invention.

SUMMARY OF THE INVENTION

In accordance with the invention claimed, an improved winterizing system is provided which substantially reduces the shortcomings and inconvenience of present methods, procedures and equipment.

It is, therefore, one object of the present invention to provide an improved winterizing system for use in preventing the freezing of plumbing lines and fixtures in a recreational vehicle or vacation home.

Another object of this invention is to provide in such a system a set of switches which are sequentially operated to control the essential solenoid valves and the pump as needed to execute the winterizing procedure.

A further object of this invention is to provide in such a system a means for insuring the proper sequence of switch operation and for preventing an improper sequence with its attendant undesirable effects.

A still further object of this invention is to provide for the actuation of such a system by means of a key and thereby to prevent tampering or undesired operation of the system.

A still further object of this invention is to provide in such a system a means for drawing anti-freeze solution directly from the shipping containers in which it is purchased.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
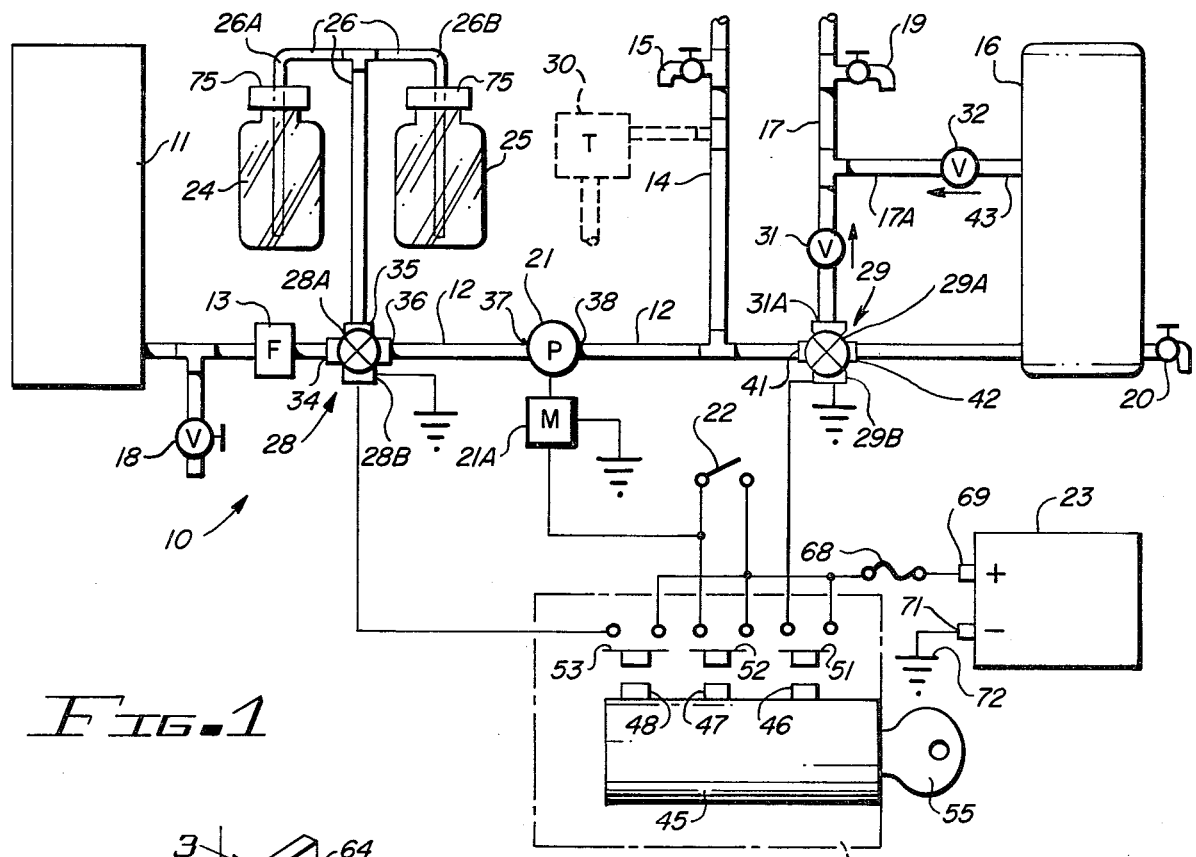
FIG. 1 is a schematic diagram illustrating the plumbing system and the associated electrical and electromechanical control circuit comprising the winterizing system of the invention.

Referring more particularly to the drawing by characters of reference, FIG. 1 discloses the improved winterizing system 10 of the invention as installed in conjunction with the plumbing system of a recreational vehicle or vacation home.

The elements of the plumbing system in which the system 10 is installed include a water storage tank 11, a first or main water conduit or line 12, a filter 13, a cold water conduit or line 14, cold water faucet 15, a water heater 16, hot water conduit or line 17, a storage tank drain valve 18, a hot water faucet 19, a water heater drain valve 20 and a water pump 21 with an electric pump motor 21A. In the normal operation of the plumbing system, the pump 21 supplies pressure to deliver water from tank 11 to the cold water line 14 and via the water heater 16 to the hot water line 17. The pump 21 is essential to the operation of the system because there is typically no connection to a pressurized water system and the tank 11 is not normally elevated to permit delivery by gravity. A manually operated pump switch 22 is utilized to control voltage supplied to the pump motor 21A from a battery or other electrical power source 23.

The system 10 comprises anti-freeze containers 24 and 25, anti-freeze delivery conduits or lines 26, an anti-freeze solenoid valve 28, a water heater bypass solenoid valve 29, check valves 31 and 32 and a key operated cam switch 33.

The anti-freeze solenoid valve 28 comprises a valve assembly 28A and an electrical solenoid 28B. The valve assembly 28A has two intake ports 34 and 35 and an outlet port 36. When solenoid 28B is not energized, water received at port 34 is exhausted at port 36. When solenoid 28B is energized, water flow from port 34 to port 36 is blocked while water received at port 35 is exhausted at port 36. As shown in FIG. 1, ports 34 and 36 are serially connected in water line 12, port 34 being connected by line 12 to tank 11 through filter 13 and port 36 being connected by line 12 to the inlet port 37 of pump 21. Port 35 is connected by lines 26 to containers 24 and 25.

Bypass solenoid valve 29 comprises a valve assembly 29A and a solenoid 29B. It has an inlet port 41 and two outlet ports 31A and 42. When solenoid 29B is not energized, water passes freely through valve 29A, entering at port 41 and leaving at port 42. When solenoid 29B is energized, flow through valve 29 is blocked at port 41 and opened at port 31A. Valve 29A is serially connected in line 12 near its entry into water heater 16 with the exhaust port 42 nearest the water heater. Port 41 is connected by line 12 to outlet port 38 of pump 21.

Cold water line 14 is connected to line 12 at a point between ports 38 and 41.

Check valves 31 and 32 pass water or antifreeze in the direction of the arrows shown in the drawing under a nominal value of forward pressure; they block flow in the opposite direction.

Hot water line 17 is connected through port 31A to line 12 at a point between ports 41 and 42. The hot water port 43 of water heater 16 is connected through check valve 32 and a conduit or line 17A to line 17 at a point just downstream from check valve 31.

When solenoid 29B is not energized, water exhausted by pump 21 flows through valve 29A into water heater 16 and exhausts through valve 32 and line 17A to hot water line 17. While solenoid 29B is energized, water from pump 21 flows through port 41 and out port 31A of valve 29 and through check valve 31 directly to line 17, the valves 29A, port 42 and check valve 32 blocking entry to water heater 16.

Heretofore, three manually controlled switches have been used to control solenoid valves 28 and 29 and pump motor 21A. To winterize such a plumbing system, a first switch is closed to energize the by-pass solenoid valve 29 to block the flow of water to water heater 16. Pump motor 21A is next energized by a second switch and finally a third switch is operated to energize the anti-freeze solenoid valve 28. With all three switches closed, the anti-freeze solution is drawn from an anti-freeze tank accessed by line 26. From line 26, the solution passed through solenoid valve 28 via ports 35 and 36, pump 21 and line 12 to cold water line 14 and to hot water line 17 via ports 41 and 31A of solenoid valve 29. Tank 11 is drained through valve 18 and water heater 16 is drained through valve 20. Faucets 15 and 19 and other cold and hot water faucets connected to lines 14 and 17, respectively, are opened until the exhausted water shows the presence of the anti-freeze solution. Toilets 30 are then flushed with the anti-freeze solution. Finally, the switches are opened to shut down the system. One cold and one hot water faucet is then opened to relieve system pressure.

To de-winterize the system and return it to normal service, valves 18 and 20 are closed, tank 11 is filled, solenoid valve 29 is energized and finally, pump 21 is turned on, again operating the switches in the proper order to energize solenoid valve 29 first and then pump motor 21A. When this is accomplished, water is drawn by pump 21 from tank 11 through valve 28 via ports 34 and 36 and is delivered from port 38 to cold water line 14 and to hot water line 17 through valve 29 via ports 41 and 31A. Faucets on lines 14 and 17 are opened until the water runs clear, indicating that the anti-freeze solution has been flushed from the lines. Solenoid valve 29 is then de-energized to permit the filling of water heater 16 and the return to normal service is completed.

In utilizing such a system, the operator is compelled to observe the proper sequence of switch operation. If he inadvertently operated the switches energizing solenoid valve 28 and pump motor 21A prior to the energizing of by-pass solenoid valve 29, the anti-freeze solution is pumped into the water heater 16. The system is also vulnerable to tampering by children or vandals and thus, while it provides a measure of convenience, it is not without its drawbacks.

The present invention substantially removes the drawbacks of the earlier switch operated system through the incorporation of the key operated cam switch 33.

Figure 2:
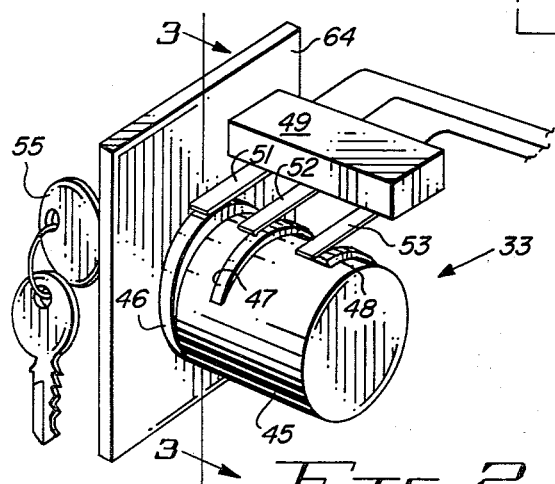
FIG. 2 is a perspective side view of an electrical control panel employed as a part of the winterizing system.
Figure 3:
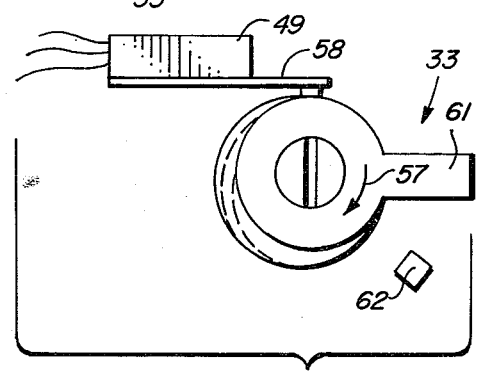
FIG. 3 is a cross-sectional view of a key-operated cam switch incorporated in the control panel as viewed along line 3—3 of FIG. 2.

As shown in FIGS. 1, 2 and 3, switch 33 comprises a cylindrical barrel 45, three cam vanes 46, 47 and 48 mounted circumferentially to barrel 45, the vanes being equally-spaced and parallel to each other, and a micro-switch assembly 49 having three micro-switches 51, 52 and 53 aligned, respectively with vanes 46, 47 and 48. Barrel 45 is fashioned to receive a key 55 inserted axially into a keyway 56 by means of which the barrel 45 may be rotated about it axis causing the vanes 46–48 to be rotated past the aligned switches 51–53. As is apparent from FIGS. 1–3, each of the cam vanes has an operating surface that rises along an incline starting at the surface of the barrel 45 and rising along the incline to a cylindrical surface elevated above the surface of barrel 45. As the barrel 45 is rotated by means of a key 55 inserted in the axial keyway 56, the working surfaces of the vanes 46–48 rotate under the switches 51–53, the starting points of the inclines passing first, followed by the rising incline and finally by the elevated cylindrical surface. The inclines of the vanes are angularly displaced relative to each other about the axis of the barrel 45 such that with rotation in the direction of arrows 57, the incline of vane 46 passes first under switch 51. The incline of vane 47 then passes under switch 52, and finally, the incline of vane 48 passes under switch 53. As each incline passes under the associated switch the rising surface under the switch approaches the operating reed 58 of the switch until the inclined surface finally comes into contact with the reed 58 at a point near the transition to the elevated cylindrical surface. At this point the associated switch 51, 52 or 53 is closed. Because of the relative angular displacements of the inclines, switch 51 is closed first, switch 52 next, and 53 last as barrel 45 is rotated in the direction 57. The proper sequence of switch operation is thus assured.

Figure 4:
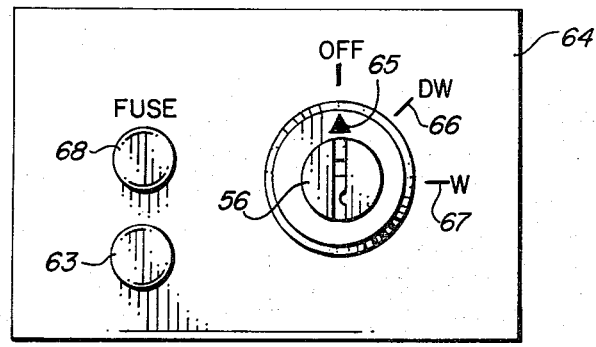
FIG. 4 is a front plan view of the control panel of FIG. 2.

An additional safety precaution is incorporated through provision of a tab 61 on barrel 45 and an aligned stop 62. The stop 62 is mechanically coupled to a push-button 63 which is accessible from the front panel or mounting plate 64 of the switch 33 as shown in FIG. 4. If push-button 63 is not depressed the stop 62 is in alignment with tab 61 and limits the rotation of barrel 45 in the direction 57 when tab 61 strikes stop 62. In this limit position switches 51 and 52 are closed but switch 53 is still open. If push-button 63 is depressed, stop 62 is moved out of alignment with tab 61 and barrel 45 may be moved past the limit position so that switch 53 will close. The limit position corresponds to the de-winterize (DW) position as shown on plate 64 of FIG. 4, with the pointer 65 directed toward the DW marker 66. When the barrel is moved past the stop or limit position while depressing push-button 63 and pointer 65 is directed toward the W marker 67, the third switch 53 is closed. The W marker indicates the winterize (W) position of switch 33.

As shown in FIG. 1, each of the three microswitches 51-53 has one terminal connected through a fuse 68 to the positive or "hot" terminal 69 of the power source 23. The negative terminal 71 of source 23 is connected to ground 72. The second terminal of switch 51 is connected to the ungrounded terminal of solenoid 29B, the second terminal of switch 52 is connected to the ungrounded terminal of motor 21A, and the second terminal of switch 53 is connected to the ungrounded terminal of solenoid 28B. The ground terminal of solenoids 28B and 29B and the ground terminal of motor 21A are connected to the common ground 72. The closing of switches 51, 52 and 53 thus energize or supply voltage to the solenoid 29B, the motor 21A and the solenoid 28B, respectively. As shown in FIG. 4, the fuse 68 is mounted for easy access on plate 64.

To winterize the plumbing system using the improved winterizing system 10, the operator first turns off the pump 21 by opening switch 22. He then depresses button 63 and turns key 55 clockwise (in the direction 57 shown in FIG. 3) until pointer 65 is directed toward the W marker 67 on plate 64. This causes the switches 51, 52 and 53 to close in the order named, properly sequencing power to the solenoid 29B, the pump 21 and the solenoid 28B. Water heater valve 20 and tank drain valve 18 are opened to drain water-heater 16, and tank 11, and each faucet on the hot and cold lines 14 and 17 is opened until anti-freeze solution appears in the discharging water, the anti-freeze solution being drawn from the containers 24 and 25 through lines 26, valve 28, pump 21 and lines 12, 14 and 17 and valve 31. When the delivery of anti-freeze solution has thus been assured and the toilet has been flushed to assure the delivery of anti-freeze there also, the system is shut down by turning key 55 and barrel 45 counterclockwise to a position where pointer 65 is directed toward the OFF indication shown in FIG. 4. In this position of the barrel 45, the ends 73 of all three cam vanes 46, 47 and 48 will have passed under the vanes 58 of the microswitches 51, 52 and 53 and all three switches will have opened.

To de-winterize and return the water system to service, valves 18 and 20 are closed, tank 11 is filled with fresh water, and key 55 is rotated clockwise to the stop position accomplishing in succession the energizing of bypass solenoid 29B and motor 21A. Individual faucets are opened one at a time until clear water appears indicating that fresh water flowing from tank 11 has flushed anti-freeze from line 12, filter 13, valve 28A, pump 21 and lines 14 and 17. Key 55 is then rotated counterclockwise to the OFF position and switch 22 is closed to turn on the pump 21. The water-heater fills with water and normal service is restored.

As an added convenience, the lines 26 are adapted to be coupled directly to the containers 24 and 25 through caps 75 which are provided with openings to receive flexible branch lines 26A and 26B of line 26. The containers 24 and 25 are the containers in which the anti-freeze solution is purchased. They are mounted in a suitable holder located, for convenience, inside the recreational vehicle or vacation home.

An improved winterizing system is thus provided in accordance with the stated objects of the invention, and although but a single embodiment of the invention has been illustrated and described, it will be apparent to those skilled in the art that various changes and modifications may be made therein without departing from the spirit of the invention or from the scope of the appended claims.

What is claimed is:

1. Apparatus for winterizing recreational vehicles, vacation homes and the like comprising:

a first conduit interconnecting a water supply with a water heater, pump means connected in said first conduit for pumping water through said first conduit from said supply toward said heater, a first solenoid valve connected to said first conduit between the water supply and said pump means, a second conduit connected to said first conduit downstream of said pump means for forming a cold water source, a third conduit connected to said first conduit downstream of said second conduit, a first check valve connected to said third conduit for passing water only downstream of said second conduit, a fourth conduit interconnecting said heater to said third conduit downstream of said first check valve, a second check valve in said fourth conduit for passing water only from said heater to said fourth conduit, a second solenoid valve connected to said first conduit between said third conduit and said heater, a fifth conduit connected to said first solenoid valve, a source of anti-freeze connected to flow into said fifth conduit, and switch means for selectively electrically energizing said pump means and said first and second solenoid valves to selectively open said second, third and fourth conduits to water from said supply or to close said second conduit to water from said supply and said heater from connection to said second conduit and to connect said first conduit through said first solenoid valve and at least a part of said second conduit to said third and fourth conduits, said switch means comprising a key operated rotary drum having a plurality of cams mounted on its outer periphery for sequentially operating said pump means and said first and second solenoids.

2. The apparatus set forth in claim 1 wherein:

said switch means further comprises a push button for controlling at least a part of the sequential operation of said switch means, said push button preventing the operation of said first solenoid valve controlling said fifth conduit until it is depressed.

3. The apparatus set forth in claim 1 wherein:

said switch means is operable in one direction to sequentially energize said second solenoid valve and said motor means and then operable in another direction to de-energize said second solenoid valve and said motor means, and a second switch means for then operating only said motor means.

* * * * *